2,824,801

PROCESS OF TREATING CHOCOLATE LIQUOR

William J. Hale, Midland, Mich., assignor to Verdurin Company, Detroit, Mich., a corporation of Michigan No Drawing. Application December 15, 1953
Serial No. 398,405

8 Claims. (Cl. 99—23)

The present invention relates to a process of treating chocolate liquor and to securing a finished product of improved quality.

This application is a continuation-in-part of prior application Ser. No. 340,925, filed March 6, 1953.

In such prior application it was explained that when cacao beans, finished chocolate and cocoa were subjected to the mild oxidizing action of such non-toxic oxidants as porphyrins and its derivatives, certain undesirable constituents were converted and without any effect on the theobromine and caffeine content.

In this prior invention considerable emphasis was laid upon the various means of introducing chlorophyll and chlorophyllin into the cacao beans. The procedure is readily accomplished but only under the most careful attention lest the beans, in drying, take fire through too rapid oxidation in air.

It is now found that the desired effect is readily securable when the end stage, or pressed-out chocolate liquor, is treated directly with a chlorophyll solution; yet even here a careful control of the temperature is demanded.

The basis of this concept lies in the great ease with which certain porphyrin-type compounds are able to take up oxygen from the air and in turn release same thereby affording a continuously operating oxidative action against certain more or less undesirable components lurking within chocolate and cocoa.

Specifically, these undesirable components may comprise trigonelline, an alkaloid known to occur normally in the coffee bean to as much as 0.5 to 1.0 percent content by weight. They may also comprise a host of breakdown products resulting from decomposition of plant proteins. Removal to large extent of trigonelline from coffee by agency of roasting with chlorophyll has been fully set forth in U. S. Patent 2,706,689, issued August 19, 1952. The resulting product is a great improvement over the old-time coffee and is accompanied by no signs of heartburn or headache so often experienced by many individuals.

An analysis of roasted cacao nibs indicates the presence of some 2.7 percent moisture; 50.12 percent fats; 1.04 percent theobromine; 0.04 percent caffeine; 12.12 percent other nitrogenous substances; 8.07 percent starch; 19.57 percent other carbohydrates; 2.64 percent fiber; and 3.66 percent ash. After milling and pressing, the cocoa-cake left carries from 8 to 15 percent cocoa butter, and when further ground with sugar and an addition of cocoa butter and a trace of lecithin (0.3 percent), we have the basis of commercial chocolate. The various procedures for preparing this or that type of chocolate do not alter appreciably the content of theobromine or other nitrogenous material with which latter the purpose of this invention is primarily concerned.

The enhancement of coffee beverage by partial removal of the toxic alkaloid trigonelline through the action of chlorophyll, as set forth in the patent above cited, suggested the possibility that cocoa products could be improved and supplied the urge to investigate the action of this mild oxidant upon those deleterious, undesirable nitrogenous factors in chocolate with the hope that possibly their removal, to some degree, would render chocolate harmless even to those most sensitive to it.

The very first experiments in this direction abundantly confirmed such postulate as affecting cacao beans, cacao nibs and chocolate liquor. Furthermore, the employment of chlorophyll, functioning in two-fold capacity both as reducing and oxidizing agent, is not without effect as reducing agent upon unsaturated aliphatic groups associated with glycerol in make-up of fatty portion of cocoa-butter. This latter characteristic of chlorophyll is always discernible when chlorophyll is partaken of by an individual allergic to unsaturated aliphatic compounds.

Cacao beans themselves, carry from $\frac{1}{500}$ to $\frac{1}{100}$ of 1 percent content of chlorophyll-carotene complex. But in the earliest stages of preparing cacao for commerce, fermentation is permitted to rid the beans of pulp, whereby considerable chlorophyll is destroyed. It remained now to restore this chlorophyll if we would study its action in improvement of bean or finished chocolate.

To this end was adopted the introduction of natural chlorophyll and its congeners as are present in green leaves generally; repeating the same with chlorophyllic material present in nuts; and finally with an extracted and hydrolyzed chlorophyll known as chlorophyllin or other porphyrin derivatives.

*Example I*

To 5 pounds (2250 grams) of melted crude chocolate liquor, direct from the hydraulic presses, was added 2 ounces of freshly crushed green leaves of alfalfa (clover, spinach or other green leaves of high chlorophyll content proved equally as serviceable). It was required here that a most vigorous stirring under intake of large quantities of air be instituted. The cocoa-butter content of the chocolate liquor immediately acted to withdraw the whole of the chlorophyll-carotene complex from the leaves. The dissolved complex proved exceedingly effective in catalyzing the oxidizing action of air intake and to such extent that scarcely one-quarter hour's heating period was required for completion of reaction registered when temperature had reached about 90° C. After cooling to near 50° C. the leafy mass was filtered off and the resulting liquor directed into molds for the market. The actual quantity of chlorophyll complex here involved analyzed for about 100 milligrams or $\frac{1}{200}$ of 1 percent by weight on the chocolate base.

*Example II*

To one pound of melted crude chocolate liquor was added 2 ounces of crushed green coffee beans already rid of its caffeine content by extraction with organic solvents (such as with trichlorethylene). The content of chlorophyll in these coffee beans ran as high as $\frac{1}{100}$ of one percent by weight. Upon warming the mixture under vigorous stirring with air, the temperature of mass rapidly rose to near 90° C. when oxidizing action was complete. After cooling somewhat and filtering, the warm liquor was directed into preparation for marketing. The actual quantity of chlorophyll-complex here involved analyzed for a mere 10 milligrams or 1/500 of one percent based on the chocolate used.

*Example III*

To 5 pounds of melted crude chocolate liquor was added 2 grams (50% concentration) of sodium potassium magnesium chlorophyllin dissolved in 100 cc. distilled water, introducing 10 cc. of the solution at intervals of 7 to 8 minutes, under constant and vigorous stirring with steady intake of air, but cooling frequently in order to prevent the temperature from over-stepping approximately 100° C. When the entire amount of the chlorophyll solution had been added, the partially cooled mass was run into molds for commercial use. The actual quantity of chlorophyllin here involved analyzed for one gram or 1/20 of 1 percent based on weight of the chocolate.

*Example IV*

Example III was repeated save that 2 grams of pheophorbide (chlorophyll deprived of its magnesium complex) was employed in place of the magnesium chlorophyllin. The results were closely comparable to those of Example III save that the finished product gave no analysis for magnesium oxide.

*Example V*

Example III was repeated save that 2 grams of calcium chlorin-E (a porphyrin from the early step in break-down of chlorophyll itself) was employed in place of the magnesium chlorophyllin. The results were closely comparable to those of Example III save that the reaction was not so easily kept under control. Furthermore, the finished product analyzed for a trace of calcium.

*Example VI*

Example III was repeated except that to the 2 grams of sodium potassium magnesium chlorophyllin solution there was added about 1/10 gram of carotene. The reaction proceeded as before save that scarcely more than three-fourths of the solution need be added to attain the same results as in Example III.

*Example VII*

Example III was repeated save that to the 2 grams of sodium potassium magnesium chlorophyllin was added about 1/10 of one gram of carotene-xanthophyll and vitamin K and 1/10 of one gram of lecithin. The reaction proceeded as before except that scarcely half of the solution need be added to attain excellent oxidative results.

The use here of lecithin is in keeping with general practice for conditioning chocolate for the market. Its presence makes for a more homogeneous product and lessens the viscosity of mass. Though the presence of water is generally not advocated, by reason of its tendency to increase viscosity, a little water here plays a most important role. Under action with chlorophyll, water enters into combination therewith to hydrate same wherein after the hydrate suffers dehydrogenation in presence of a hydrogen acceptor, as are the unsaturated fatty acids present, the resulting peroxide loses nascent oxygen and reverts to the original chlorophyll structure. It is this liberated oxygen that assists materially in the oxidative, over-all effect in the process.

When once it was learned that trigonelline suffers a decomposition of some type when heated with chlorophyll (see above), it was decided to try out a number of nitrogen containing molecules known to result in the metabolism of proteins, namely, histidine and its decarboxylated form histamine, cysteine and its oxidized form cystine. Practically all of these break-down products from protein are destroyed by the action of cholorphyll. All of which led to the purport of the present invention.

Naturally, the resulting gently oxidized chocolate, when so treated with chlorophyll, should display none of the characteristics accompanying break-down proteins. When, therefore, such oxidized chocolate is partaken by individuals known to be allergic to ordinary chocolate, there should appear no unpleasantness such as choking of the bronchial tubes, sinusitis, skin eruptions and the like. The results surpass the highest expectations. This gently oxidized chocolate can be eaten by those highly sensitive to ordinary chocolate; hence the inference that ordinary chocolate is really accompanied by just that type of compound known as histamine so prone to affect bronchial regions. Chemical analysis also confirms this conclusion though the quantity of histamine present is extremely small.

While preferred modifications of the invention have been described, it is to be understood that these are given to explain the underlying principles involved and not as limiting the useful scope of the invention to the illustrative procedures.

I claim:

1. A method of improving chocolate and cocoa which comprises admixing such chocolate and cocoa with a solution of a non-toxic oxygen-carrying porphyrin capable of taking up and releasing oxygen from air and heating the mass while incorporating air therein to a temperature and for a time sufficient to destroy a substantial portion of nitrogenous substances other than the normally present theobromine.

2. A method of enhancing the beverage quality and confectionary quality of cocoa and chocolate which comprises incorporating within such cocoa and chocolate no more than approximately one percent by weight of a non-toxic oxygen-carrying porphyrin capable of taking up and releasing oxygen from air and heating the mass while incorporating air therein to a temperature at which the greater portion of undesirable nitrogenous substances are destroyed.

3. A method of enhancing the beverage quality of cocoa and chocolate which comprises incorporating within the warmed liquor an appreciable quantity of crushed fresh green leaves, such as will supply to the mass approximately 1/500 to 1/10 of one percent its weight of chlorophyll-carotenoid complex by extraction of said leaves and then heating the mass while incorporating air therein to effect decomposition of undesirable nitrogenous material, then filtering and recovering the liquor product.

4. A method of enhancing the beverage quality of cocoa and chocolate which comprises incorporating within the warmed liquor an appreciable quantity of crushed fresh extracted coffee beans, such as will supply to the mass approximately 1/500 to 1/10 of one percent its weight of chlorophyll-carotenoid complex by extraction of said beans and then heating the mass while incorporating air therein to effect decomposition of undesirable nitrogenous material, finally filtering and recovering the filtrate.

5. A method of enhancing the beverage quality and confectionary quality of cocoa and chocolate which comprises incorporating within such cocoa and chocolate no more than approximately one percent by weight of a water-soluble chlorophyllin dissolved in an amount of water sufficient to hydrate the chlorophyll and heating the mass to a temperature of about 100° C. and for a period of time sufficient to destroy a substantial part of the nitrogenous substances other than the naturally occurring theobromine.

6. A method of enhancing the beverage quality and confectionary quality of cocoa and chocolate which comprises incorporating within such cocoa and chocolate no more than approximately one percent by weight of a water-soluble chlorophyllin-carotenoid complex dissolved in an amount of water sufficient to hydrate the chlorophyll and heating the mass to a temperature of about 100° C. and for a period of time sufficient to destroy a substantial part of the nitrogenous substances other than the naturally occurring theobromine.

7. A method of enhancing the beverage quality and confectionary quality of cocoa and chocolate which comprises incorporating within such cocoa and chocolate no more than approximately one percent by weight of a water-soluble pheophorbide dissolved in an amount of water sufficient to hydrate the chlorophyll and heating the mass to a temperature of about 100° C. and for a period of time sufficient to destroy a substantial part of the nitrogenous substances other than the naturally occurring theobromine.

8. A product prepared by the method of claim 1.

References Cited in the file of this patent

UNITED STATES PATENTS

| | | |
|---|---|---|
| 141,832 | Tamin | Aug. 12, 1873 |
| 893,074 | Herron | July 14, 1908 |
| 2,139,304 | Forbes | Dec. 6, 1938 |

OTHER REFERENCES

"Drug Trade News," June 23, 1952, 27:13, page 25, article: Rystan Lists 94 Chlorophyll Products on Market.